(12) United States Patent
Viquez Calderon et al.

(10) Patent No.: US 10,587,433 B2
(45) Date of Patent: Mar. 10, 2020

(54) PROCESSING VIRTUAL LOCAL AREA NETWORK

(71) Applicant: Hewlett Packard Enterprise Development LP, Houston, TX (US)

(72) Inventors: Claudio Enrique Viquez Calderon, Heredia (CR); Diego Valverde Garro, Heredia (CR); Osvaldo Andres Sanchez Melendez, Heredia (CR); Jose Daniel Hernandez Vargas, Heredia (CR)

(73) Assignee: Hewlett Packard Enterprise Development LP, Houston, TX (US)

( * ) Notice: Subject to any disclaimer, the term of this patent is extended or adjusted under 35 U.S.C. 154(b) by 43 days.

(21) Appl. No.: 15/773,721

(22) PCT Filed: Nov. 25, 2015

(86) PCT No.: PCT/US2015/062599
§ 371 (c)(1),
(2) Date: May 4, 2018

(87) PCT Pub. No.: WO2017/091219
PCT Pub. Date: Jun. 1, 2017

(65) Prior Publication Data
US 2018/0324002 A1 Nov. 8, 2018

(51) Int. Cl.
*H04L 12/46* (2006.01)
*H04L 12/28* (2006.01)
(Continued)

(52) U.S. Cl.
CPC ...... *H04L 12/4645* (2013.01); *H04L 12/2852* (2013.01); *H04L 12/46* (2013.01);
(Continued)

(58) Field of Classification Search
CPC ............. H04L 12/4633; H04L 12/4641; H04L 12/4645; H04L 45/66; H04L 49/354
See application file for complete search history.

(56) References Cited

U.S. PATENT DOCUMENTS 7,672,314 B2 * 3/2010 Elangovan ............ H04L 12/465
370/254
7,706,371 B1 4/2010 Wing et al.
(Continued)

FOREIGN PATENT DOCUMENTS

CN 101146018 A 3/2008

OTHER PUBLICATIONS

International Searching Authority, The International Search Report and the Written Opinion, PCT/US2015/062599, dated Aug. 17, 2016, 12 Pgs.
(Continued)

*Primary Examiner* — Ahmed Elallam
(74) *Attorney, Agent, or Firm* — Hewlett Packard Enterprise Patent Department (57) ABSTRACT

Example implementations relate to a networking device. For example, an implementation may receive a data processing packet identified as belonging to a processing virtual local area network. The networking device may execute an instruction associated with the data processing packet on data associated with the data processing packet and store resultant data in the payload of the data processing packet. The networking device may route the data processing packet with resultant data stored in the payload to a next device.

17 Claims, 5 Drawing Sheets

(51) Int. Cl.
*H04L 12/931* (2013.01)
*H04L 12/721* (2013.01)

(52) U.S. Cl.
CPC ...... *H04L 12/4633* (2013.01); *H04L 12/4641* (2013.01); *H04L 49/354* (2013.01); *H04L 45/66* (2013.01)

(56) References Cited

U.S. PATENT DOCUMENTS

| | | | |
|---|---|---|---|
| 2010/0260146 A1* | 10/2010 | Lu | H04L 12/4633 370/331 |
| 2011/0142045 A1 | 6/2011 | Ait-Ameur et al. | |
| 2012/0030451 A1 | 2/2012 | Pong et al. | |
| 2013/0091349 A1* | 4/2013 | Chopra | H04L 45/50 713/150 |
| 2013/0212297 A1 | 8/2013 | Varga | |
| 2013/0215895 A1* | 8/2013 | Feng | H04L 12/4645 370/392 |
| 2013/0322449 A1 | 12/2013 | Hwang et al. | |
| 2013/0343378 A1 | 12/2013 | Veteikis et al. | |
| 2014/0059111 A1 | 2/2014 | Veeraiyan | |
| 2014/0119203 A1* | 5/2014 | Sundaram | H04L 43/10 370/250 |
| 2015/0036502 A1 | 2/2015 | Gooch et al. | |
| 2015/0131798 A1* | 5/2015 | Chopra | H04L 45/50 380/270 |
| 2015/0200848 A1 | 7/2015 | Janakiraman et al. | |
| 2016/0036774 A1* | 2/2016 | Chong | H04L 45/02 370/392 |
| 2016/0173373 A1* | 6/2016 | Guichard | H04L 45/74 370/392 |
| 2018/0198704 A1* | 7/2018 | Viquez | H04L 49/15 |
| 2018/0343198 A1* | 11/2018 | Stark | H04L 69/22 |

OTHER PUBLICATIONS

International Preliminary Report on Patentability received for PCT Patent Application No. PCT/US2015/062599, dated Jun. 7, 2018, 9 pages.

* cited by examiner

PROCESSING VIRTUAL LOCAL AREA NETWORK

BACKGROUND

A network may include interconnected networking devices such as switches. Computing devices may connect to one another by way of a network. The computing devices may exchange information by transmitting packets over the network.

BRIEF DESCRIPTION OF THE DRAWINGS

Various examples will be described below with reference to the following figures.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Use herein of a reference numeral without a hyphenated index number, where such reference numeral is referred to elsewhere with a hyphenated index number, may be a general reference to the corresponding plural elements, collectively or individually.

DETAILED DESCRIPTION

A network may include computing devices interconnected by networking devices such as, for example, switches, routers, gateways, access points, etc. The computing devices (e.g., servers, workstations, desktop computers, laptop computers, smart phones, smart devices, or other network-enabled devices) may exchange information in the form of packets, which include a header to guide packet transmission and a payload to carry data. Networking devices may include any combination of hardware, firmware, and software (e.g., machine readable instructions executable by a processor) for providing networking functionality, including the transmission or routing of packets. For example, a networking device may include a networking application-specific integrated circuit (ASIC) having a programmable engine (or engines) and dedicated logic.

A programmable engine of a networking ASIC may be a microprocessor coupled to a machine readable medium (e.g., random access memory (RAM), read-only memory (ROM), electrically erasable programmable read-only memory (EEPROM), flash memory, etc.) that stores machine readable instructions. A programmable engine also may utilize other resources on the ASIC such as tables, counters, and ternary content-addressable memory (TCAM). A programmable engine of the networking ASIC may be designed to offer flexible networking functionality, such as advanced packet processing (e.g., network traffic control decisions, packet forwarding decisions, etc.). The dedicated logic of the networking ASIC may be fixed logic (e.g., instructions on a ROM or electronic circuitry) optimized for performing frequently recurring functions, such as receiving packets or forwarding packets (e.g., according to forwarding decisions made by a programmable engine).

A network may be partitioned into virtual local area networks (VLANs). For example, a VLAN may be configured on a network according to the IEEE 802.1Q standard, although other protocols also may be utilized. Under the IEEE 802.1Q standard, the header of a packet includes a destination address, a source address, and an 802.1Q tag (referred to herein generally as a VLAN ID) that indicates membership of that packet in a particular VLAN. A networking device may parse the header and determine the VLAN ID. The networking device handles packet of a particular VLAN ID according to how the networking device was configured to respond to that determined VLAN ID by, e.g., a network administrator (e.g., with specific routing behaviors, etc.). Thus, a VLAN can be isolated to the networking devices configured to recognize the VLAN ID.

As described above, computing devices may exchange information over a network. Some computational activities, such as data mining, mathematics operations, simulations, data-intensive computing, and the like, may be distributed for processing by multiple dedicated computing devices (e.g., servers, workstations, etc., also generally referred to as nodes). In some examples, each of the computing devices participating in such distributed processing may be assigned a unit of work by a computing system that oversees and organizes the distributed processing. The computing devices complete their respective assigned units of work and send the results back to the overseeing system or another related system. However, setting up and maintaining multiple dedicated computing devices or nodes can be expensive.

Example techniques of the present application may relate to, among other things, a networking device that can receive a data processing packet identified as belonging to a processing VLAN, execute an instruction associated with the data processing packet on data associated with the data processing packet, store resultant data in the payload, and route the data processing packet with resultant data stored in the payload to a next device. Accordingly, the systems and techniques of the present description may be useful for leveraging established distributed networking infrastructure to parallelize and accelerate computational activities.

Figure 1:
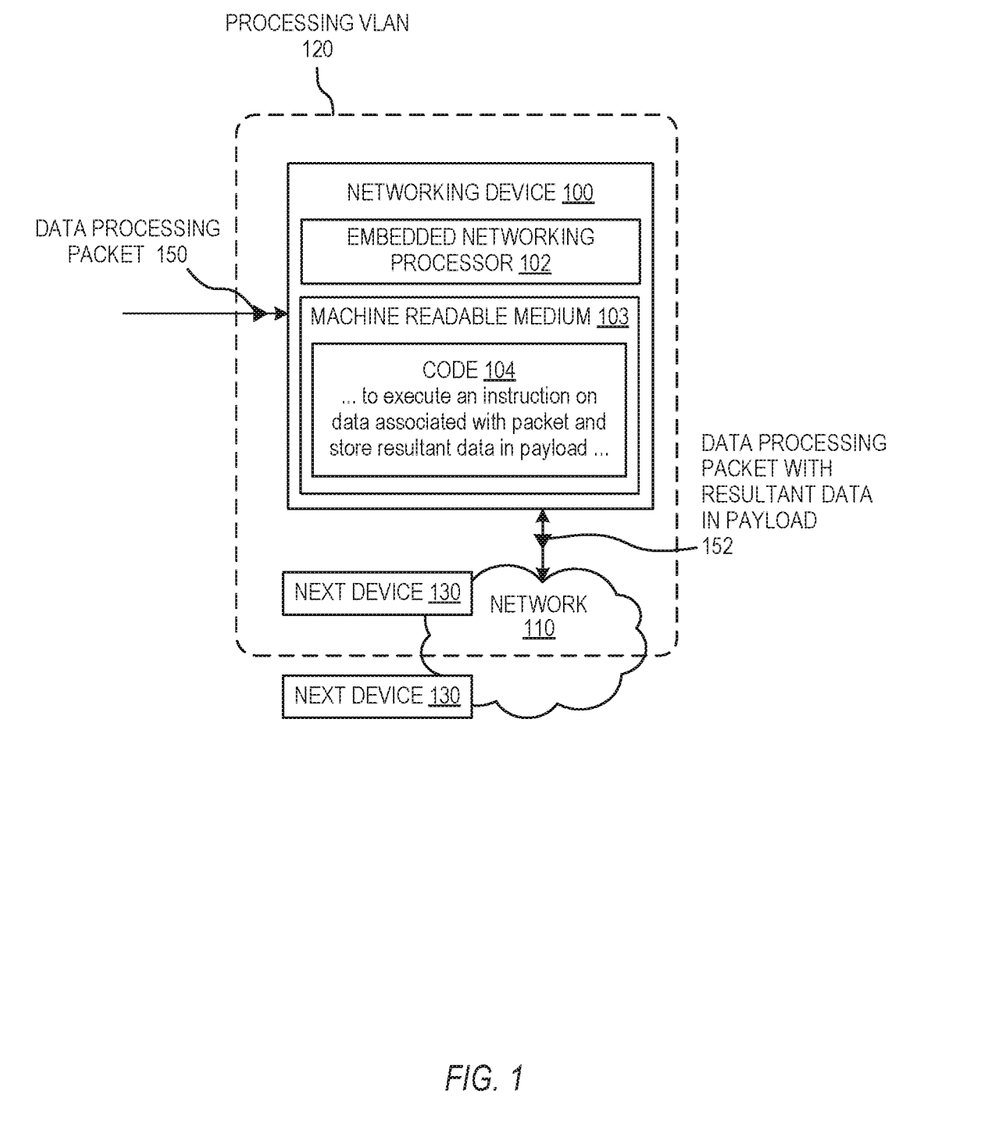
FIG. 1 is a block diagram that depicts an example networking device that receives data processing packets belonging to a processing virtual local area network, according to an implementation.

Referring now to the figures, FIG. 1 is a block diagram that depicts a networking device 100. The networking device 100 may be or form part of, for example, a switch, an access point, a gateway, a router, a port extender, a firewall appliance, etc. In operation, the networking device 100 may be connected to a network 110, thus becoming part of the network 110. The network 110 may include other networking devices and/or computing devices not shown.

The networking device 100 includes an embedded networking processor 102 and a non-transitory machine readable medium 103 storing code 104 (e.g., machine readable instructions). The embedded networking processor 102 may be a microcontroller, a microprocessor, central processing unit core(s), an ASIC, a field programmable gate array (FPGA), and/or other hardware device suitable for retrieval and/or execution of code 104 stored on a machine readable medium 103. Additionally or alternatively, the embedded networking processor 102 may include one or more hardware devices including electronic circuitry or dedicated logic for implementing functionality described herein. The non-transitory machine readable medium 103 may be any medium suitable for storing executable code 104, such as random access RAM, ROM, EEPROM, flash memory, or the like.

In some implementations, the embedded networking processor 102 together with the non-transitory machine readable medium 103 may include, may serve as, or may form part of a programmable engine. Additionally, the embedded networking processor 102 may include or be coupled to dedicated logic.

A "processing ULAN" 120 may be defined for at least part of the network 110. For example, a network administrator may configure some networking devices of the network 110 (including networking device 100) to recognize a VLAN ID assigned to the processing VLAN 120, while not configuring other networking devices of the network 110 to recognize that VLAN ID.

The code 104, when executed by the embedded networking processor 102, may cause the embedded networking processor 102 to receive a data processing packet 150 identified by the networking device 100 as belonging to a processing VLAN 120. The data processing packet 150 may include a header (which holds the VLAN ID) and a payload.

More particularly, in some implementations, the data processing packet 150 initially may be received by dedicated ingress logic at the networking device 100 along with other packets that may or may not belong to the processing VLAN 120. Dedicated logic of the networking device 100 (alternatively, the embedded networking processor 102) parses those received packets to identify a ULAN ID and passes the data processing packet 150 (packets belonging to the processing VLAN) to the embedded networking processor 102 for handling as described herein.

For a data processing packet 150 identified as belonging to the processing VLAN, the code 104 may cause the embedded networking processor 102 to execute an instruction associated with the data processing packet 150 on data associated with the data processing packet 150. The instruction also may be referred to as a data operation or data operator in some examples.

The instruction may include, for example and without limitation, an arithmetic operation (e.g., addition, subtraction, multiplication, division, etc.), a logic operation (e.g., AND, OR, NOT, XOR, etc.), a relational operation (e.g., less than, greater than, equal to, etc.), a shift or rotation operation, or a data manipulation operation (e.g., remove bit(s) from the data, copy bit(s) from the data, insert new data into the payload, etc.). In some implementations, other instructions in addition to the foregoing examples may be executed by the code 104. For example, the networking device 100 may be useful in support of distributed processing as described above, and the data associated with the data processing packet 150 is or forms part of a work unit assigned to the networking device 100. Thus, the instruction associated with the data processing packet 150 and executed by the embedded networking processor 102 may be an instruction relevant to the distributed processing, whether an arithmetic operation, logic operation, relational operation, shift and rotate operation, data manipulation operation, or other operation not described herein. Additionally, it should be understood that the instruction may be among multiple instructions associated with the data processing packet 150 and/or the instruction may be made up of multiple sub-instructions.

In some implementations, the instruction and/or the data are associated with the data processing packet 150 by virtue of being included in the payload of the data processing packet 150 as received. In such cases, the embedded networking processor 102 may extract the instruction and/or the data from the payload and execute the extracted instruction on the extracted data. For example, extraction of the instruction may cause the embedded networking processor 102 to be reprogrammed to perform the functions encoded in the instruction, and the embedded networking processor 102 may utilize tables, TCAM, RAM, etc. included within or otherwise available to the embedded networking processor 102 to perform those functions.

Additionally or alternatively, the instruction and/or the data may be predefined, encoded, or otherwise stored on the embedded networking processor 102. For example, storing an instruction on the embedded networking processor 102 (e.g., a frequently used instruction) may be efficient, because that instruction need not be transferred in a data processing packet 150, thus reducing network bandwidth utilization. Similarly, some data may be constants (e.g., pi), results from prior processing, or other data that are stored on the embedded networking processor 102, to improve efficiency.

After execution of the instruction on the data, the code 104 may cause the embedded networking processor 102 to store the resultant data (i.e., data resulting from execution of the instruction on the data) in the payload of the data processing packet 150, to generate a data processing packet 152 to be sent by the networking device 100 to a next device 130. Accordingly, the data processing packet 152 with resultant data in its payload may also be referred to as an outgoing packet.

The code 104 may cause the embedded networking processor 102 to route the data processing packet 152 with resultant data stored in the payload to a next device 130. For example, the embedded networking processor 102 may make routing decisions for the packet 152, and dedicated egress logic included in or coupled to the embedded networking processor 102 may forward the packet 152 according to those routing decisions. In some implementations, the data processing packet 150 as initially received by the networking device 100 may include multiple destination addresses (e.g., provided by a computing system overseeing distributed processing in which the networking device 100 is participating), and the embedded networking processor 102 may determine where to route the packet 152 with resultant data based on those destination addresses. For example, in the case of distributed processing, an overseeing computing system may plan for a networking device 100 to perform a first processing operation on some data, and a next device 130 to perform a subsequent processing operation on the output of the first processing operation. Thus, the embedded networking processor 102 of the networking device 100 may determine that the packet 152 should be routed to the next device 130, based on routing information included in the packet 150 by the overseeing computing system.

In some examples, the next device 130 may be another networking device that is associated with the processing VLAN 120 (depicted in FIG. 1 as the next device 130 inside the dashed box representing the processing VLAN 120), and the next device 130 performs further processing with the resultant data included in the payload. In other examples, the next device 130 may be unassociated with the processing VLAN 120 (depicted in FIG. 1 as the next device 130 outside the dashed box representing the processing VLAN 120). In some cases, the embedded networking processor 102 may route the data processing packet 152 with resultant data to multiple next devices 130. For example, in the case of distributed processing, the data processing packet 152 may be routed to multiple devices that utilize the resultant data.

Figure 2:
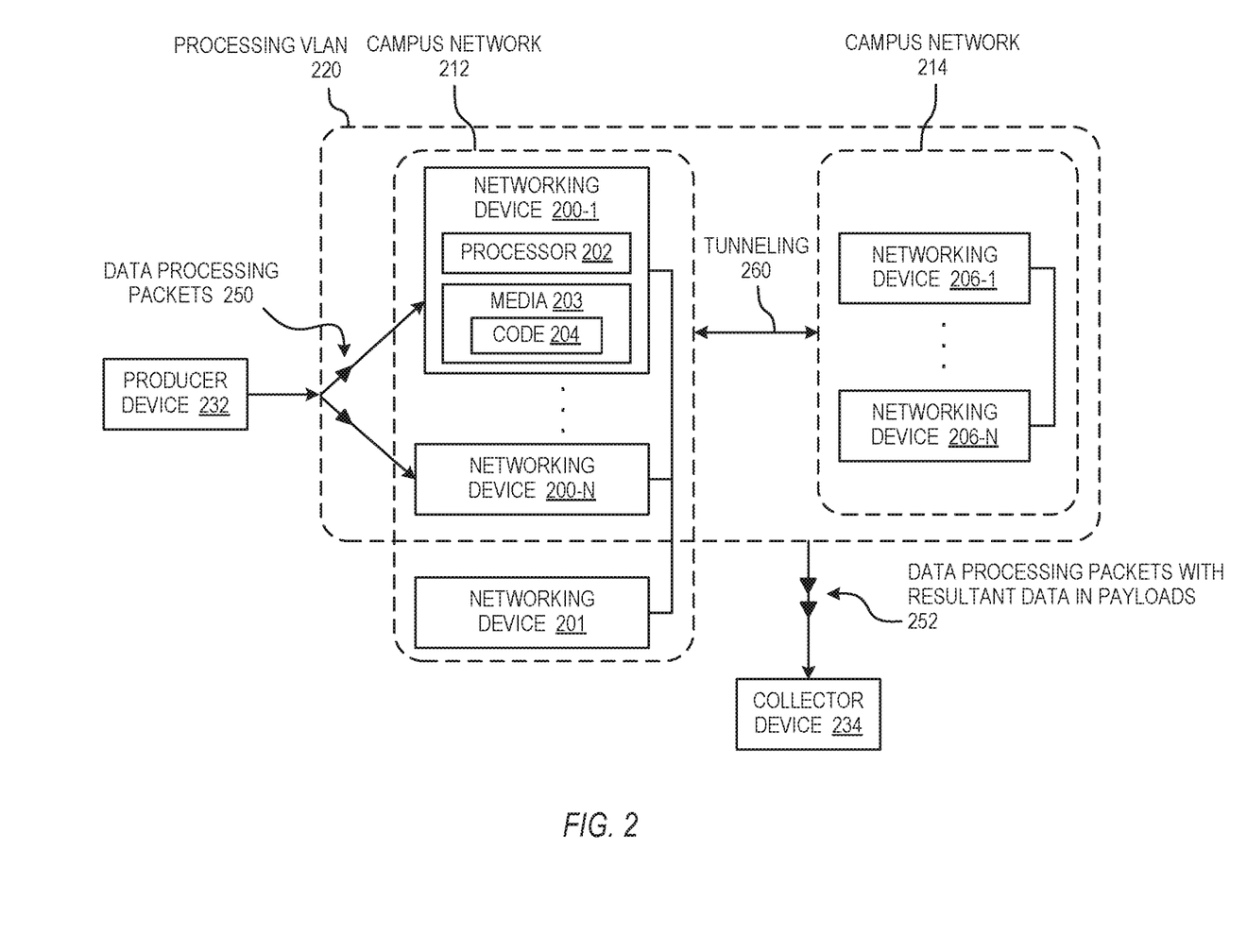
FIG. 2 is a block diagram that depicts example networking devices that receive data processing packets belonging to a processing virtual local area network, according to an implementation.

FIG. 2 is a block diagram that depicts example networking devices that receive data processing packets belonging to a processing virtual local area network, according to an implementation. As shown in FIG. 2, multiple networking devices 200-1 through 200-N (collectively 200) and 201 are interconnected and furthermore are located together geographically as a campus network 212. Computing devices connected to the campus network 212 may exchange information via the interconnected networking devices 200. Similarly, multiple networking devices 206-1 through 206-N (collectively 206) are interconnected and located together geographically as a campus network 214.

In some examples, a campus network may be a group of interconnected networking devices at an educational institution (e.g., college, university, etc.), a research institute, a corporation or corporate campus, or the like. The campus networks 212, 214 may be connected by tunneling 260 or like technologies. In some implementations, the campus networks 212, 214 may be geographically separate. For example, the campus network 212 may be located in New York City while the campus network 214 may be located in Tokyo. In some examples, the techniques described herein may apply to different configurations and numbers of networking devices and campus networks than that shown in FIG. 2.

The networking devices 200, 206 may be analogous in many respects to the networking device 100. For example, representing the networking devices 200, 206 of FIG. 2, the networking device 200-1 may include an embedded network processor 202 (analogous to embedded network processor 102) and a machine readable medium 203 (analogous to medium 103) storing code 204 (analogous to code 104). As with code 104, the code 204 may cause the embedded network processor 202 to receive a data processing packet belonging to a processing VLAN, execute an instruction associated with the data processing packet on data associated with the data processing packet and store resultant data in the payload of the packet, and route the data processing packet with resultant data stored in the payload to a next device.

In FIG. 2, a processing VLAN 220 is defined for at least a part of the campus network 212 and the campus network 214, by configuration of the networking devices (by a network administrator) to recognize a VLAN ID representing the processing VLAN 220. Thus, the processing VLAN 220 may be understood to include geographically distributed campus networks (212, 214) connected by network tunneling (260), each of the campus networks (212, 214) including a plurality of networking devices (200, 206, respectively).

Some networking devices may not be configured to recognize the VLAN ID, and thus are unassociated with the processing VLAN 220. For example, to illustrate, a networking device 201 of the campus 212 may be unassociated with the processing VLAN 220 (depicted in FIG. 2 as being outside the dashed box of the processing VLAN 220). As such, a data processing packet bearing the processing VLAN ID arriving at the networking device 201 will not be processed by executing instructions and data associated with the data processing packet.

A producer device 232 is connected to the network of campus 212 in the example of FIG. 2. The producer device 232 may be a computing device, such as a server, a workstation, a desktop computer, a laptop computer, a smart device, or any other network-enabled device. In some examples, the producer device 232 may distribute a plurality of data processing packets 250 to a plurality of networking devices (e.g., as illustrated in FIG. 2, the networking devices 200-1 and 200-N of campus network 212 receive packets 250). In some implementations, the plurality of data processing packets 250 together form a larger work, such as in the case of distributed processing.

In some cases, a networking device may be more useful for processing data within the processing VLAN 220 when the networking device is idle due to network traffic behavior (e.g., low network traffic activity, and thus less computational demand on the embedded network processor of the networking device). In some implementations, the producer device 232 may distribute data processing packets 250 in view of information about network traffic behavior and/or load on the networking devices, in order to efficiently leverage available processing bandwidth or capabilities of the networking devices.

Each of the networking devices may process received data processing packets 250 belong to the processing VLAN 220 in a manner analogous to that described above with respect to the networking device 100. As described above, a networking device may route the data processing packet with resultant data to a next device. In the example of FIG. 2, a next device may be another networking device (e.g., networking device 200-1 may route a packet with resultant data to the networking device 200-N, or to the networking device 206-1 via tunneling 260), to which the packet is routed for further processing under the processing VLAN 220 or for transmission along the network to another destination. In other cases, the next device may be a computing device, such as the collector device 234, which will now be described.

A collector device connected to the network (e.g., the campus network 212 or 214) may receive from the plurality of networking devices 200, 206 a plurality of data processing packets 252, each data processing packet 252 carrying resultant data. In particular, the collector device 234 may receive a packet 252 when instruction(s) associated with or in the payload of that packet have been completed (i.e., no instructions remain uncompleted), or when the packet has been routed to each destination address specified by the producer device 232 for that packet. The collector device 234 may be a computing device similar to the producer device 232 (e.g., a server, a workstation, a desktop computer, a laptop computer, a smart device, or any other network-enabled device), and in some instances, the collector device 234 and the producer device 232 may be the same computing device.

Figure 3:
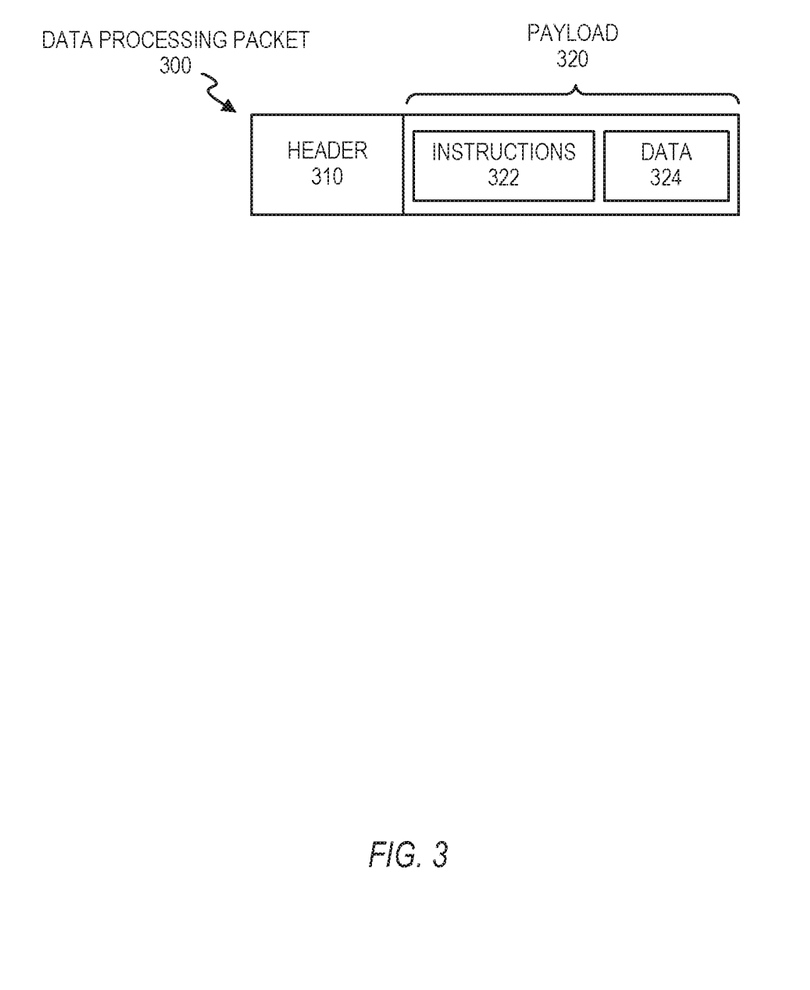
FIG. 3 is an illustration of an example data processing packet, according to an implementation.

FIG. 3 is an illustration of an example data processing packet 300, according to an implementation. The data processing packet 300 includes at least a header 310 and a payload 320. The header 310 may include a VLAN ID (e.g., an IEEE 802.1Q tag) that indicates that the data processing packet 300 belongs to the processing VLAN. The payload 320 includes instructions 322 and data 324. A networking device (e.g., 100, 200-1, etc.) may extract the instructions 322 and the data 324, execute the instructions 322 on the data 324, and store the resultant data into the payload 320.

Figure 4:
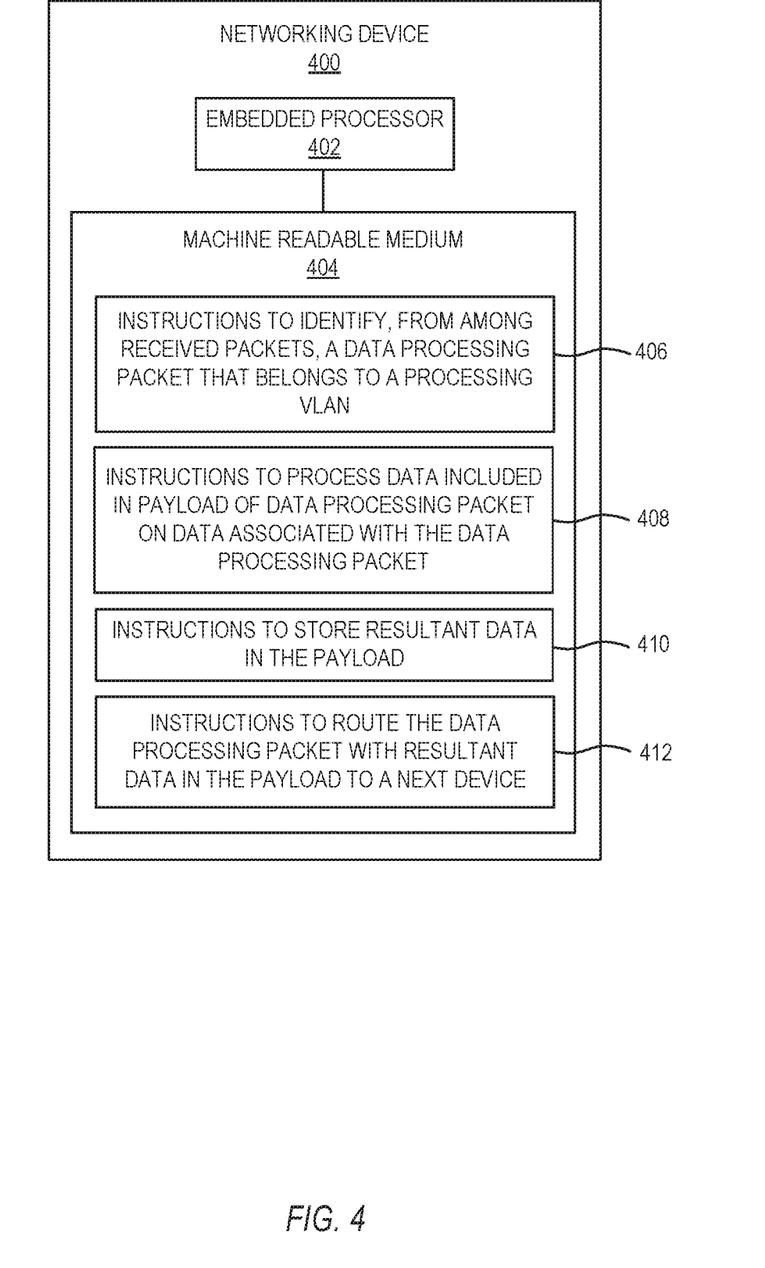
FIG. 4 is a block diagram of a networking device that includes a non-transitory, machine readable medium encoded with example instructions to process data included in a payload of a data processing packet, according to an implementation.

FIG. 4 is a block diagram of a networking device 400 that includes a non-transitory, machine readable medium encoded with example instructions to process data included in a payload of a data processing packet, according to an implementation. In some implementations, the networking device 400 may include at least one embedded processor 402 coupled to the machine readable medium 404. In some implementations, the networking device 400 may serve as or form part of the networking device 100 of FIG. 1 or the networking devices of FIG. 2 (e.g., 200, 206). The networking device 400 may be connected to a network, and may receive multiple packets from the network.

The embedded processor 402 may include a microcontroller, a microprocessor, central processing unit core(s), an ASIC, an FPGA, and/or other hardware device suitable for retrieval and/or execution of instructions from the machine readable medium 404 to perform functions related to various examples. Additionally or alternatively, the embedded processor 402 may include or be coupled to electronic circuitry or dedicated logic for performing some or all of the functionality of the instructions described herein.

The machine readable medium 404 may be any medium suitable for storing executable instructions, such as RAM, ROM, EEPROM, flash memory, a hard disk drive, an optical disc, or the like. In some example implementations, the machine readable medium 404 may be a tangible, non-transitory medium, where the term "non-transitory" does not encompass transitory propagating signals. The machine readable medium 404 may be disposed within the networking device 400, as shown in FIG. 4, in which case the executable instructions may be deemed installed or embedded on the networking device 400. Alternatively, the machine readable medium 404 may be a portable (e.g., external) storage medium, and may be part of an installation package.

As described further herein below, the machine readable medium 404 may be encoded with a set of executable instructions or code 406, 408, 410, 412. It should be understood that part or all of the executable instructions and/or electronic circuits included within one box may, in alternate implementations, be included in a different box shown in the figures or in a different box not shown.

Instructions 406, when executed by the embedded processor 402, may identify, from among packets received at the networking device 400, a data processing packet that belongs to a processing VLAN. The data processing packet can have a payload section.

Instructions 408, when executed by the embedded processor 402, may process data included in the payload using a data operation associated with the data processing packet to generate resultant data. In some implementations, the data operation may be analogous to the instruction associated with the data processing packet 150 as described above. For example, the data operation may include an arithmetic operation, a logic operation, a relational operation, a shift and rotation operation, a data manipulation operation, or other operation relevant to a type of processing for which the processing VLAN is established.

In some implementations, a data operation may be stored on the embedded processor. Additionally or alternatively, a data operation may be included in the payload of the data processing packet, and the embedded processor 402 may extract such data operation from the payload of the data processing packet for use in processing data according to instructions 408. In some examples, a data processing packet may be associated with multiple instructions, or an instruction may include multiple sub-instructions.

Instructions 410, when executed by the embedded processor 402, may store resultant data (i.e., data resulting from processing according to instructions 408) in the payload of the data processing packet. Instructions 412, when executed by the embedded processor 402, may route the data processing packet with resultant data stored in the payload (by instructions 410) to a next device. In some implementations, the next device is another networking device that is associated with the processing VLAN, and the next device is to perform further processing with the resultant data included in the payload. Moreover, in some implementations, the networking device 400 and the next device may be part of a geographically distributed processing VLAN, similar to the processing VLAN 220 described above.

Figure 5:
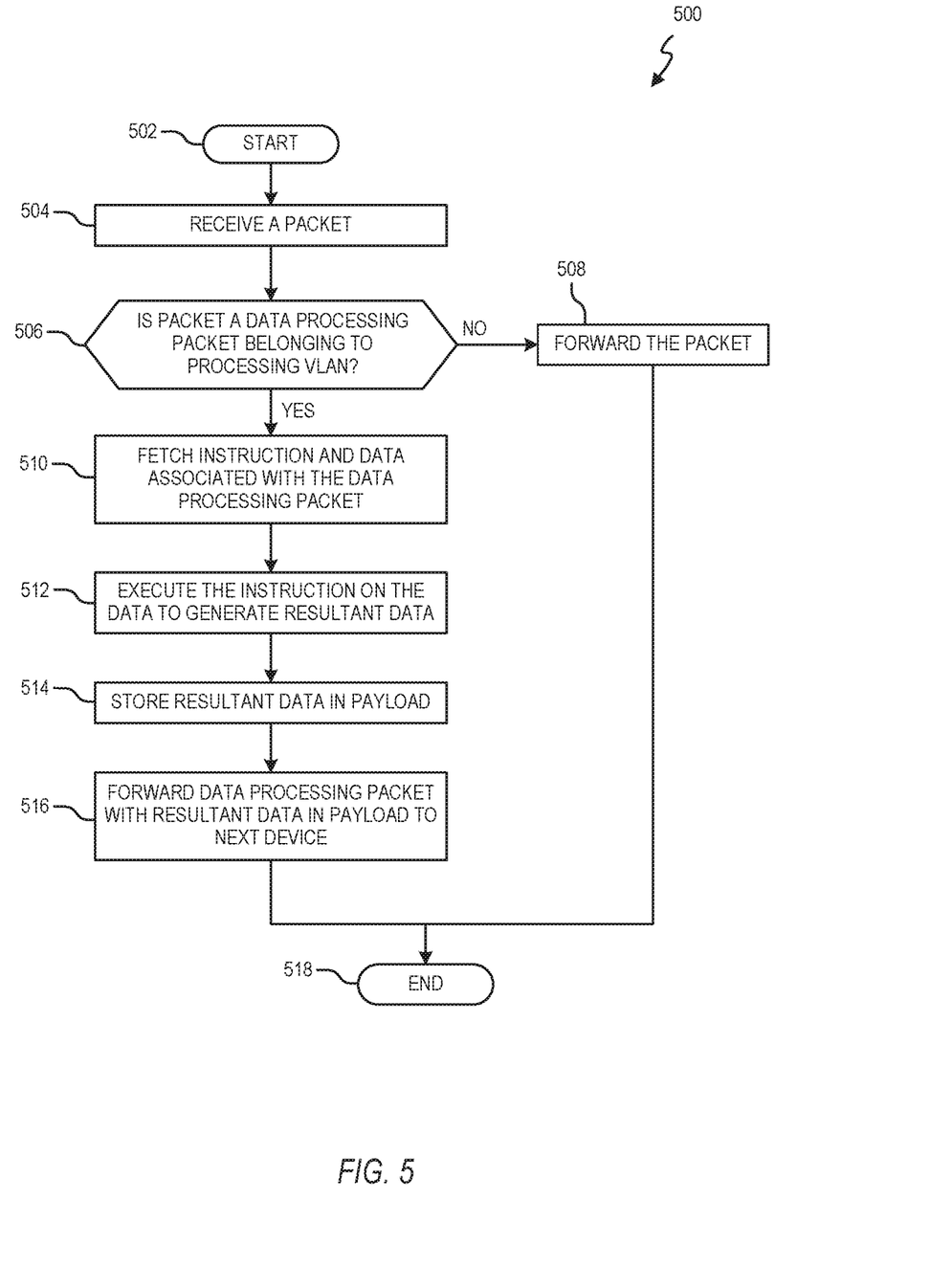
FIG. 5 is a flowchart of an example method that executes an instruction on data associated with a data processing packet, according to an implementation.

FIG. 5 is a flowchart of an example method 500 that executes an instruction on data associated with a data processing packet, according to an implementation. Method 500 may be implemented in the form of executable instructions stored on a machine readable medium and executed by a processing resource (e.g., a microcontroller, a microprocessor, central processing unit core(s), an ASIC, a FPGA, etc.) and/or in the form of electronic circuitry. For example, method 500 below may be performed by the networking device 100 of FIG. 1, and more particularly, at least parts of method 500 may be performed by the embedded network processor 102 executing code 104 stored on the machine readable medium 103. In some implementations of the present disclosure, one or more blocks of method 500 may be executed substantially concurrently or in a different order than shown in FIG. 5. In some implementations of the present disclosure, method 500 may include more or less blocks than are shown in FIG. 5. In some implementations, one or more of the blocks of method 500 may, at certain times, be ongoing and/or may repeat.

The method 500 may begin at block 502, and continue to block 504, where a networking device connected to a network may receive a packet. At block 506, the networking device determines whether the packet received at block 504 is a data processing packet that belongs to a processing VLAN defined for at least part of the network. In some implementations of block 506, dedicated logic or an embedded networking processor of the networking device may parse the received packet to identify VLAN ID information in the header.

In some cases, the data processing packet may be among a plurality of data processing packets distributed by a producer device to different networking devices of the network that are associated with the processing VLAN. Such a plurality of data processing packets together forms a larger work.

If the received packet does not belong to the processing VLAN ("NO" at block 506), the networking device may forward the received packet according to destination information in the packet header at block 508, and then the method ends at block 518.

If the received packet belongs to the processing VLAN ("YES" at block 506), control passes to block 510. At block 510, an embedded networking processor of the networking device fetches an instruction and data associated with the data processing packet. In some examples, the instruction and/or the data is stored in a payload of the data processing packet. Alternatively or additionally, the instruction and/or data can be stored on the networking device (e.g., in RAM, TCAM, or tables accessible by the embedded networking processor).

At block 512, the embedded networking processor executes the fetched instruction on the fetched data to generate resultant data. The instruction may be an arithmetic operation, a logic operation, a relational operation, a shift and rotation operation, a data manipulation operation, or other data processing operation. At block 514, the embedded networking processor stores the resultant data in the payload of the data processing packet.

At block 516, the data processing packet with resultant data in the payload is forwarded to a next device (e.g., another networking device or a computing device, such as a server or workstation). For example, block 516 may include the embedded networking processor making routing decisions and dedicated logic of the networking device forwarding the data processing packet with resultant data based on the routing decisions. The method 500 ends at block 518. The method 500 may be repeated as packets arrive at the networking device.

In view of the foregoing description, it can be appreciated that embedded networking processors of networking devices such as switches may be leveraged, particularly when the processors are idle owing to network traffic behavior, to perform distributed processing. Accordingly, resource consumption of servers may be reduced by offloading at least some computational activities. By virtue of networking devices forming established distributed infrastructure, distributed computational activities can be parallelized and accelerated without significant expenditures. Additionally, computing devices that leverage a processing VLAN on networking devices in the foregoing manner may be useful for edge computing in support of an Internet of Things paradigm.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A networking device to connect with a network, the networking device comprising:
    an embedded networking processor; and
    a non-transitory machine readable medium storing code that, when executed by the embedded networking processor, causes the embedded networking processor to:
        receive a data processing packet identified by the networking device as belonging to a processing virtual local area network (VLAN) defined for at least part of the network, wherein an instruction and data are included in a payload of the data processing packet, and the instruction and the data are associated with the data processing packet,
        extract the instruction from the payload,
        execute the instruction extracted from the data processing packet on the data extracted from the data processing packet and store resultant data in the payload of the data processing packet, and
        route the data processing packet with resultant data stored in the payload to a next device.

2. The networking device of claim 1, wherein the data processing packet is among a plurality of data processing packets distributed by a producer device to a plurality of networking devices in the network,
    the networking device included among the plurality of networking devices, and
    the plurality of data processing packets together forming a larger work.

3. The system of claim 2, wherein a collector device connected to the network receives from the plurality of networking devices the plurality of data processing packets, each data processing packet carrying resultant data.

4. The system of claim 1, wherein the next device is another networking device that is associated with the processing VLAN, and the next device is to perform further processing with the resultant data included in the payload.

5. The system of claim 1, wherein the instruction includes an arithmetic operation, a logic operation, a relational operation, a shift and rotation operation, or a data manipulation operation.

6. The system of claim 1, wherein the processing VLAN includes geographically distributed campus networks connected by network tunneling, each of the campus networks including a plurality of networking devices.

7. A non-transitory machine readable medium storing instructions executable by an embedded processor of a networking device, the non-transitory machine readable medium comprising:
    instructions to identify, from among packets received at the networking device, a data processing packet that belongs to a processing virtual local area network (VLAN), the data processing packet having a payload;
    instructions to extract a data operation from the payload of the data processing packet;
    instructions to process data included in the payload using the data operation extracted from the payload of the data processing packet to generate resultant data;
    instructions to store the resultant data in the payload; and
    instructions to route the data processing packet with the resultant data in the payload to a next device.

8. The non-transitory machine readable medium of claim 7, wherein the embedded processor stores another data operation.

9. The non-transitory machine readable medium of claim 7, wherein the data operation includes an arithmetic operation, a logic operation, a relational operation, a shift and rotation operation, or a data manipulation operation.

10. The non-transitory machine readable medium of claim 7, wherein the next device is another networking device that is associated with the processing VLAN, and the next device is to perform further processing with the resultant data included in the payload.

11. The non-transitory machine readable medium of claim 7, wherein the processing VLAN includes geographically distributed campus networks connected by network tunneling, each of the campus networks including a plurality of networking devices.

12. A method comprising:
    receiving a packet at a networking device connected to a network;
    determining, by the networking device, whether the received packet is a data processing packet that belongs to a processing virtual local area network (VLAN) defined for at least part of the network, the data processing packet having a payload;
    if the packet does not belong to the processing VLAN, forwarding the received packet; and
    if the packet belongs to the processing VLAN:
        extracting, by an embedded networking processor of the networking device, an instruction and data included in the payload of the data processing packet,
        executing, by the embedded networking processor, the instruction on the data to generate resultant data,
        storing, by the embedded networking processor, the resultant data in the payload, and
        forwarding the data processing packet with the resultant data in the payload to a next device.

13. The method of claim 12, wherein
the instruction includes an arithmetic operation, a logic operation, a relational operation, a shift and rotation operation, or a data manipulation operation.

14. The method of claim 12, wherein the data processing packet is among a plurality of data processing packets distributed by a producer device to different networking devices of the network that are associated with the processing VLAN, the plurality of data processing packets together forming a larger work.

15. The method of claim 14, further comprising receiving, by a collector device connected to the network, the plurality of data processing packet from the different networking devices, each of the plurality of data processing packets carrying resultant data.

16. The method of claim 12, wherein the next device is another networking device that is associated with the processing VLAN, and the next device is to perform further processing on the resultant data included in the payload.

17. The method of claim 12, wherein the processing VLAN includes geographically distributed campus networks connected by network tunneling, each of the campus networks including a plurality of networking devices.

* * * * *